United States Patent
Jain et al.

(10) Patent No.: US 9,430,014 B2
(45) Date of Patent: Aug. 30, 2016

(54) SYSTEM AND METHOD FOR IDLE STATE OPTIMIZATION IN A MULTI-PROCESSOR SYSTEM ON A CHIP

(71) Applicant: Qualcomm Incorporated, San Diego, CA (US)

(72) Inventors: Ankur Jain, San Diego, CA (US); Unnikrishnan Vadakkanmaruveedu, Phoenix, AZ (US); Vinay Mitter, San Diego, CA (US); Henri Begin, Lyons, CO (US); Praveen Chidambaram, Boulder, CO (US)

(73) Assignee: QUALCOMM INCORPORATED, San Diego, CA (US)

( * ) Notice: Subject to any disclaimer, the term of this patent is extended or adjusted under 35 U.S.C. 154(b) by 429 days.

(21) Appl. No.: 13/945,181

(22) Filed: Jul. 18, 2013

(65) Prior Publication Data
US 2015/0026495 A1    Jan. 22, 2015

(51) Int. Cl.
*G06F 1/32* (2006.01)

(52) U.S. Cl.
CPC ............... *G06F 1/32* (2013.01); *G06F 1/3203* (2013.01)

(58) Field of Classification Search
CPC ................................. G06F 1/32; G06F 1/3203
See application file for complete search history.

(56) References Cited

U.S. PATENT DOCUMENTS

| | | | |
|---|---|---|---|
| 6,470,289 B1 | 10/2002 | Peters et al. | |
| 6,909,922 B2 | 6/2005 | Tymchenko | |
| 7,584,369 B2 | 9/2009 | Capps, Jr. et al. | |
| 7,814,489 B2 | 10/2010 | Uemura et al. | |
| 2003/0196127 A1 | 10/2003 | Olsen | |
| 2008/0162972 A1 | 7/2008 | Liu et al. | |
| 2008/0184044 A1* | 7/2008 | Leech | G06F 1/28 713/300 |
| 2011/0145617 A1 | 6/2011 | Thomson et al. | |
| 2011/0173474 A1 | 7/2011 | Salsbery et al. | |
| 2012/0144183 A1* | 6/2012 | Heinrichs | G06F 11/3062 713/100 |
| 2013/0019120 A1 | 1/2013 | Salsbery et al. | |
| 2013/0191667 A1* | 7/2013 | Haj-Yihia | G06F 1/3243 713/322 |
| 2014/0189399 A1* | 7/2014 | Govindaraju | G06F 1/324 713/323 |
| 2014/0195829 A1* | 7/2014 | Bhandaru | G06F 1/26 713/300 |
| 2015/0135189 A1* | 5/2015 | Song | G06F 1/3203 718/104 |

OTHER PUBLICATIONS

International Search Report and Written Opinion—PCT/US2014/047231—ISA/EPO—Oct. 23, 2014.

* cited by examiner

*Primary Examiner* — Abdelmoniem Elamin
(74) *Attorney, Agent, or Firm* — Smith Tempel

(57) ABSTRACT

Various embodiments of methods and systems for idle state optimization in a portable computing device ("PCD") are disclosed. An exemplary method includes comparing an aggregate power consumption level for all processing cores in the PCD to a power budget and, if there is available headroom in the power budget, transitioning cores operating in a first idle state to a different idle state. In doing so, the latency value associated with bringing the transitioned cores out of an idle state and into an active state, should the need arise, may be reduced. The result is that user experience and QoS may be improved as an otherwise idle core in an idle state with a long latency time may be better positioned to quickly transition to an active state and process a workload.

40 Claims, 5 Drawing Sheets ured as an example, instance, or illustration..."

SYSTEM AND METHOD FOR IDLE STATE OPTIMIZATION IN A MULTI-PROCESSOR SYSTEM ON A CHIP

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices. Most PCDs in the marketplace include a multi-core processor that, depending on a particular use case, may operate at varying frequencies and active core configurations.

One unique aspect of PCDs is that they typically do not have active cooling devices, like fans, which are often found in larger computing devices such as laptop and desktop computers. Consequently, thermal energy generation is often managed in a PCD through the application of various thermal management techniques that may include transitioning processing cores between active processing states and idle states based on real time, or near real time, workload demand. By transitioning a core from an active processing state to an idle state, power consumption associated with the active state may be avoided when the core is not needed for processing a workload.

Placing a core in an idle state, however, can negatively impact the quality of service ("QoS") provided by the PCD to its user. For instance, many PCD use cases generate "burst loads" and, if a core is not in an active state ready to quickly process the burst workload, the user experience will inevitably suffer. Consequently, placing a core in an idle state that has a high latency time for transition back to an active state may be desirable if the goal is to save power but, at the same time, undesirable if the goal is to optimize QoS during a burst load.

Accordingly, what is needed in the art is a method and system for optimizing selection of core idle states in view of an overall power budget in the PCD so that latency times are minimized when a core is transitioned back to an active state.

SUMMARY OF THE DISCLOSURE

Various embodiments of methods and systems for idle state optimization in a portable computing device ("PCD") are disclosed. An exemplary method for idle state optimization in a PCD includes determining a power budget for the PCD. Notably, because the form factors for PCDs vary, one of ordinary skill in the art will recognize that an allowable or maximum power budget may vary according to the particular form factor of a PCD. Next, the aggregate power consumption level for all processing cores may be compared to the power budget and, if less than the power budget, cores operating in an idle state may be identified as being eligible for transition to a different idle state.

Based on the operating temperature of the eligible cores, the likely impact on the aggregate power consumption may be determined should one or more of the eligible cores be transitioned from a first idle state (e.g., a power collapsed idle state) to a second idle state (e.g., a "wait for interrupt" idle state). If transitioning the one or more cores to a different idle does not increase the aggregate power consumption above the power budget, then the one or more cores may be transitioned. In doing so, the latency value associated with bringing the transitioned cores out of an idle state and into an active state, should the need arise, may be reduced. The result is that user experience and QoS may be improved as an otherwise idle core in an idle state with a long latency time may be better positioned to quickly transition to an active state and process a workload.

Based on the operating temperature of the eligible cores, the likely impact on the aggregate power consumption may be determined should one or more of the eligible cores be transitioned from a first idle state (e.g., a power collapsed idle state) to a second idle state (e.g., a "wait for interrupt" idle state). If transitioning the one or more cores to a different idle does not increase the aggregate power consumption above the power budget, then the one or more cores may be transitioned. In doing so, the latency value associated with bring the transitioned cores out of an idle state and into an active state, should the need arise, may be reduced. The result is that user experience and QoS may be improved as an otherwise idle core in an idle state with a long latency time may be better positioned to quickly transition to an active state and process a workload.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
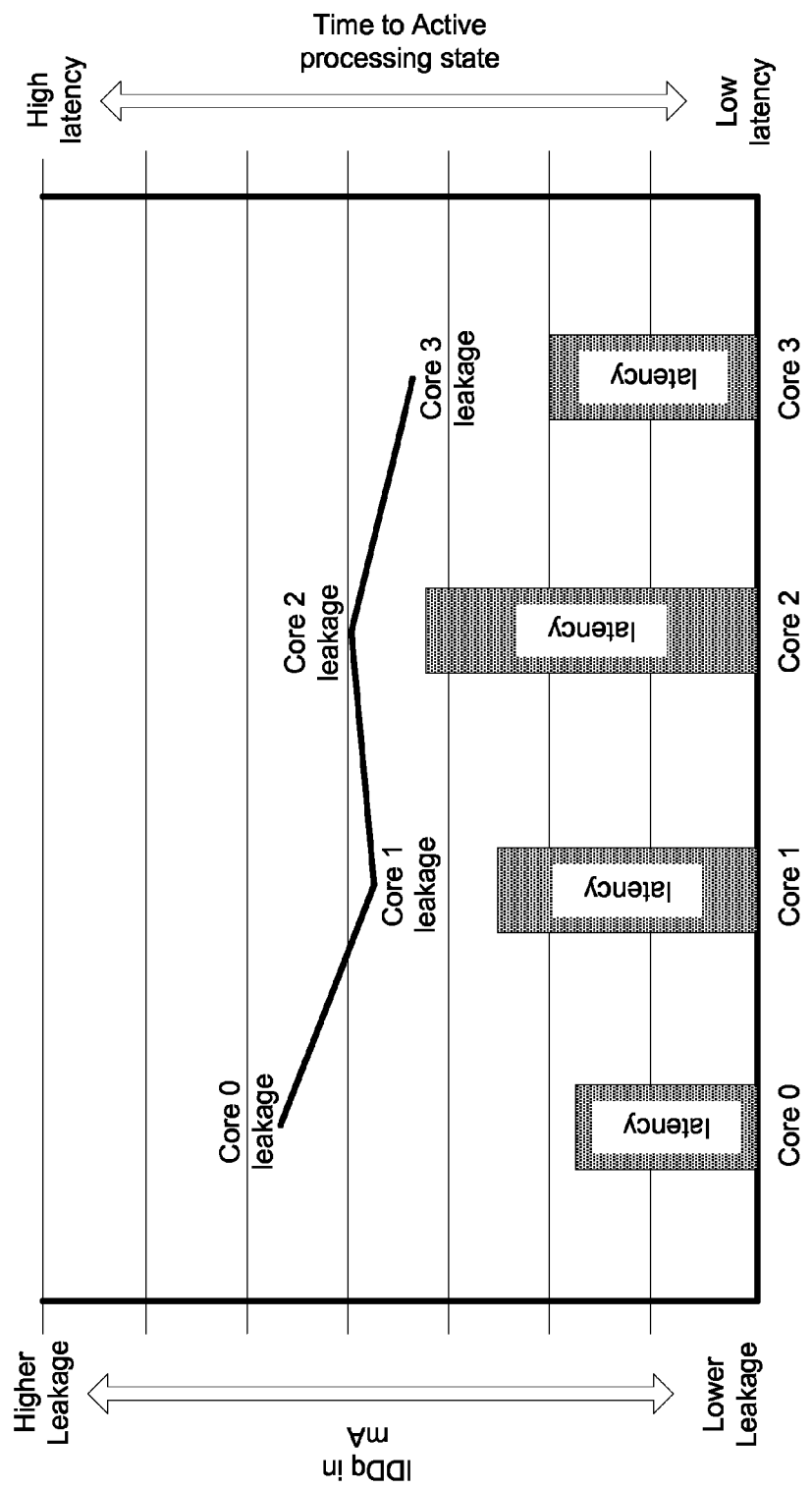
FIG. 1 is a graph illustrating for a given idle state and junction temperature the latencies and leakage rates associated with exemplary cores 0, 1, 2 and 3 in a given quad core chipset of a portable computing device ("PCD").

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component," "processing engine," "application processor" and the like are intended to refer to a computer-related entity, either hardware, firmware, a combination of hardware and software, software, or software in execution and represent exemplary means for providing the functionality and performing the certain steps in the processes or process flows described in this specification. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "chip" and "chipset" are non-limiting examples of processing components that may reside in a PCD and are used interchangeably except when otherwise indicated. Moreover, as distinguished in this description, a CPU, DSP, or a chip or chipset may be comprised of one or more distinct processing components generally referred to herein as "core(s)."

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load," and "process workload" are used interchangeably and generally directed toward the processing burden, or percentage of processing burden, that is associated with, or may be assigned to, a given processing component in a given embodiment. Similarly, the term "burst load" is used to indicate a workload that requires prioritization over other queued workloads and, therefore, should be processed immediately to optimize user experience. A burst load may further represent a relatively large workload that not only requires immediate processing but also a relatively high processing capacity.

Further to that which is defined above, a "processing component" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal processing load" and the like are indicative of workload burdens that may be running on a processing component, one of ordinary skill in the art will acknowledge that use of these "thermal" terms in the present disclosure may be related to process load distributions, workload burdens and power consumption.

In this description, the terms "thermal mitigation technique(s)," "thermal policies," "thermal management" and "thermal mitigation measure(s)" are used interchangeably.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a tablet, a smartbook or reader, a media player, a combination of the aforementioned devices, a laptop computer with a wireless connection, among others.

In this description, the term "latency" is generally used to reference the time it takes for a given processing component to transition from a certain idle state to an active state for processing a workload, such as a burst workload. Multiple idle states may be available for a given exemplary core and distinguished one from the other based on the latency and the leakage power of the core for each idle state. Generally speaking, the higher the latency associated with a certain idle state the lower the leakage rate (i.e., the lower the power consumption). Accordingly, as one of ordinary skill in the art will understand, an idle state associated with a high latency may afford better power savings as contrasted to an idle state associated with a high leakage rate which may afford better QoS when additional processing capacity in the PCD is required.

For convenience of describing the exemplary embodiments, this description describes three idle states, namely, a "wait for interrupt" ("WFI") idle state, a retention idle state and a power collapse idle state. Even so, embodiments of the systems and methods are not limited to just three idle states or any particular combination of idle states. As one of ordinary skill in the art will understand, any number of idle states may be available and employed in a PCD, each such state offering varying latency levels and power savings levels. Advantageously, embodiments of the system and method for idle state optimization recognize the differing latencies and power savings associated with available idle states and leverage those differences to optimize QoS and user experience. QoS and user experience is optimized by the various embodiments through both strategic assignment of individual cores to various idle states as well as transitioning among idle states and an active processing state. Assignment to, and transitioning among, idle and active states is determined through application of an idle state optimization algorithm that considers an overall power budget of a particular PCD when balancing power savings goals (i.e., thermal mitigation goals) with QoS/user experience goals (i.e., efficient processing of workloads, particularly burst loads).

When a processing core enters a WFI idle state, its processor clock is stopped, or "gated off," until an interrupt or debug event occurs. As such, the core is no longer in an active state for processing a workload (thus saving power consumption) but remains ready to quickly transition back to an active state in the event that an interrupt is detected (such as for processing a burst load). Even though the core is not consuming power for processing a workload when it is in the WFI idle state, voltage is being supplied to the core and a measurable current inevitably remains on the power supply rail of the core in the form of a leakage current. Notably, the leakage current can be directly correlated with the temperature of the core (i.e., the junction temperature) and therefore one of ordinary skill in the art will recognize that measurement of the core's temperature can be used to calculate its ongoing rate of power consumption (regardless of the idle state in which the core may be).

The retention idle state is similar to the WFI idle state in that a processing core in the retention state has been clock gated. Further, though, when in the retention state the power voltage supplied to the processing core is also reduced. An advantage of the retention state over the WFI state is that less leakage current is associated with the retention state and, therefore, power savings in the retention state is improved over the WFI state. Notably, however, the latency time for the processor to return to an active state from the retention idle state is increased as compared to transitioning from the WFI state.

The third exemplary idle state is the power collapse idle state. As compared to the retention idle state, a processing core that enters the power collapse idle state is fully clocked and all power is removed from its power supply rail. Consequently, the power savings associated with the power collapse idle state is improved over the WFI and retention states; however, the latency associated with the power collapse idle state is the longest in duration of all three exemplary states because the core must go through a warm boot sequence in order to transition back to an active state.

Again, the general description of, and reference to, the above three idle states that may be available to an exemplary processing component are offered for illustrative purposes only and are not meant to imply or suggest that embodiments of the systems and methods are only applicable to three idle states. It is envisioned that any number of idle states may be leveraged by embodiments of the systems and methods. Some idle states may clock gate a processor and/or reduce its power supply via software whereas other idle states may do so via hardware. Similarly, in addition to clock gating and reducing power to a processing component, some idle states may further turn off memory, drivers, bus hardware or the like. Generally, though, the more extreme the measures taken in a given idle state to conserve power, the longer it will take for a processor that is in that idle state to return to an active processing state.

Notably, it is envisioned that not all processing cores will exhibit equivalent power savings and latencies when operating at a given temperature and in a given idle state. As one of ordinary skill in the art will recognize, performance characteristics of various processing cores when in the same idle state and at the same operating temperature may differ for any number of reasons including, but not limited to, differing levels of silicon, design variations, etc. Moreover, one of ordinary skill in the art will recognize that the performance characteristics associated with any given processing core may vary in relation with the operating temperature of that processing core, the power supplied to that processing component according to the idle state, etc.

For instance, consider an exemplary heterogeneous multi-core processor which may include a number of different processing cores generally ranging in performance capacities from low to high (notably, one of ordinary skill in the art will recognize that an exemplary heterogeneous multi-processor system on a chip ("SoC") which may include a number of different processing components, each containing one or more cores, may also be considered). As would be understood by one of ordinary skill in the art, a low capacity to medium capacity processing core within the heterogeneous processor will exhibit a lower power leakage rate in a given idle state, and consequently a lower rate of thermal energy generation, than a processing core having a relatively high performance capacity and in the same idle state. For these reasons, one of ordinary skill in the art will recognize that, even though a high capacity core may be the most desirable for processing a burst load, a low capacity core may be more desirable in certain scenarios for designation to a WFI idle state as its lower leakage rate may not cause an overall power budget to be exceeded.

FIG. 1 is a graph illustrating, for a given idle state and junction temperature, the latencies and leakage rates associated with exemplary cores 0, 1, 2 and 3 in a given quad core chipset of a PCD. Notably, although certain features and aspects of the various embodiments are described herein relative to a quad core chipset, one of ordinary skill in the art will recognize that embodiments may be applied in any multi-core or single core chip.

In the exemplary illustration, for a given junction temperature and idle state, each of the cores exhibits unique performance characteristics in terms of latencies and power consumption. Core 0 is capable of transitioning back to an active processing state relatively quickly (Core 0 latency), yet it also has a relatively high leakage power level (Core 0 leakage). Core 1 would be relatively slower to return to an active processing state than cores 0 and 3 but is not as slow as Core 2. The IDDq rating of Core 1 (Core 1 leakage) also makes it the second most efficient of the cores in terms of leakage rate.

Advantageously, the core-to-core variations in latencies and quiescent leakage rates can be leveraged by an idle state selection ("ISS") module to select processing components best suited for transitioning to various idle states, so that power consumption in the PCD is managed without unnecessarily lengthening latency periods for processing burst loads. For example, if the given idle state represented by the chart in FIG. 1 is a WFI idle state, and Core 3 is presently in a power collapse idle state, the ISS module may choose to transition Core 3 from the power collapse idle state to the WFI idle state so that the latency of Core 3 is minimized in the event that a burst load requires processing. Furthering the example, in making the selection to transition Core 3 to the WFI idle state from a power collapse state, the ISS may recognize that an increased leakage rate associated with Core 3 will impact the overall power budget of the PCD. Even so, the increased power consumption represented by positioning Core 3 in the WFI idle state may be outweighed by the benefit of reducing its latency should its processing capacity be needed on short notice. In this way, the ISS module works to efficiently select idle states for each core (not just core 3) that is not being used to actively process a workload so that the user experience, as may be measured in latency, is optimized without exceeding an overall power budget.

Figure 2:
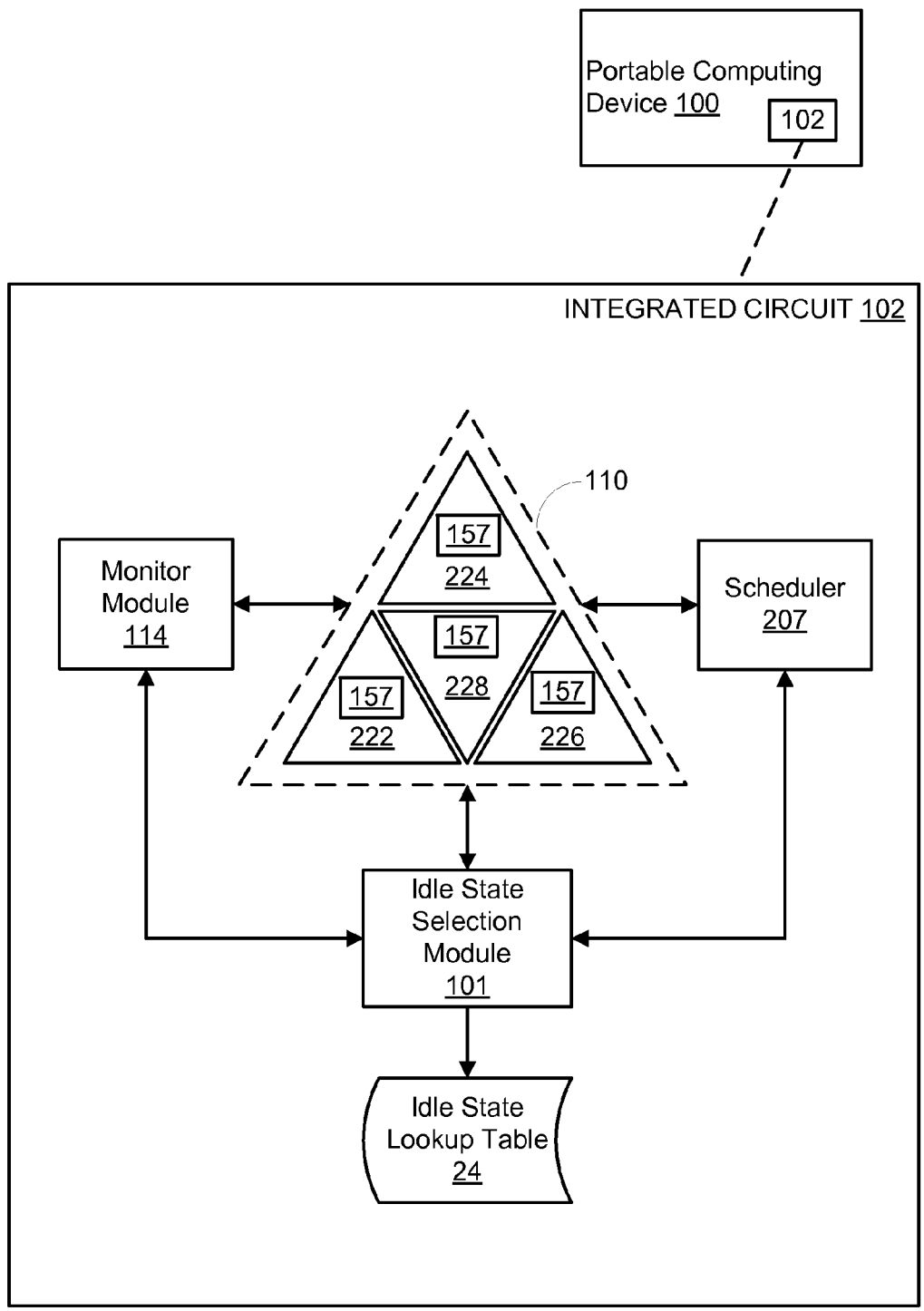
FIG. 2 is a functional block diagram illustrating an embodiment of an on-chip system for idle state optimization in a multi-core PCD.

FIG. 2 is a functional block diagram illustrating an embodiment of an on-chip system 102 for idle state selection and optimization in a heterogeneous, multi-core PCD 100. As explained above, it is envisioned that embodiments of a system and method for idle state optimization may be used in any SoC with one or more processing cores which may, or may not, be heterogeneous. It is further envisioned, however, that embodiments of the systems and methods may be particularly useful in a heterogeneous, multi-core PCD as the differing performance characteristics of the cores at varying operating temperatures and within different idle states may present significant flexibility in minimizing latencies in view of managing the overall power budget of the PCD. For this reason, the exemplary embodiments in this description are primarily described within the context of a heterogeneous, multi-core PCD; however, one of ordinary skill in the art will recognize that embodiments of a idle state optimization system or method is not limited to PCDs which include a heterogeneous, multi-core processing component.

Turning to the FIG. 2 illustration, an idle state selection ("ISS") module 101 is in communication with a heterogeneous, multi-core processor 110, a monitor module 114, a scheduler 207 and an idle state lookup table ("LUT") 24. In operation, the monitor module 114 is monitoring, among other things, temperature sensors 157 which may individually positioned to monitor junction temperatures associated with each of cores 222, 224, 226 and 228. The monitored temperatures may be viewed as the operating temperatures of the cores and, as explained above, are correlative to power that is being consumed by each of the cores 222, 224, 226, 228.

The ISS module 101 receives the temperatures as measured by temperature sensors 157 via the monitor module 114 and, based on those temperatures and the present state of each core (whether an active state or an idle state), may query LUT 24. For each core, depending on its temperature and particular state, the ISS module 101 may query data similar to the chart illustrated in FIG. 1. Also, for a given core, the ISS module 101 may query LUT 24 to determine performance characteristics of the core if transitioned to an operating state other than its present operating state. The ISS module 101 may further communicate with a scheduler 207 to identify or determine queued workloads that may require processing capacity not presently available through whichever of cores 222, 224, 226, 228 are in an active operation state.

From the various queries and the monitored data, the ISS module 101 may calculate the present power consumption of all the cores 222, 224, 226, 228 and compare it to an overall power budget associated with PCD 100. If the overall power budget is exceeded (or a threshold associated with the overall power budget is exceeded), the ISS module 101 may elect to transition one or more of cores 222, 224, 226, 228 to an idle state from an active state or to a different idle state from an idle state, recognizing that the power savings associated with the transition(s) come as a tradeoff in the added latency should the transitioned core(s) be asked to come back online as an active core(s). If there is headroom in the overall power budget, however, the ISS module 101 may select one or more of the cores 222, 224, 226, 228 to transition to either an active state or an idle state associated with lower latencies. In doing so, the ISS module 101 may recognize that, should the transitioned core(s) be needed to quickly process a sudden workload increase (or an upcoming queued workload increase), the reduction in latency would be preferred over the increased power consumption associated with the transition to a "more ready" idle state (such as from a retention idle state to a WFI idle state).

With regard to the selection of core(s) 222, 224, 226, 228 by the ISS module 101 to transition from one state to another, it is envisioned that the selection may be based on a comparison of the overall power budget of the PCD 100 with the power consumption level anticipated to result from the transition(s). To make the comparison, the ISS module 101 may compare operating characteristics stored in LUT 24 for a given core, at its present operating temperature and in association with multiple idle states. Again, recognizing that a core's power consumption is correlative with its operating temperature, an ISS module 101 may compare power consumption levels associated with a given core at a given operating temperature when in different operating states to determine a probable impact on the overall power consumption of the PCD 100 should the given core be transitioned from one operating state to another (e.g., from a power collapse idle state to a WFI idle state).

Notably, although the FIG. 2 illustration depicts an embodiment of an idle state optimization system and method that queries a LUT 24 to determine a likely impact on latency and power consumption should a core(s) be transitioned from one operating state to another, it is envisioned that other embodiments may not use a LUT 24 and, in the alternative, may use mathematical functions to calculate the impacts. As one of ordinary skill in the art will recognize, because the power consumption of a core when in a given operating state can be determined from the measured operating temperature of the core, embodiments of the systems and methods may simply calculate the likely impacts on latency and power consumption.

Notably, the content of the LUT 24 may be empirically collected on each of the cores 222, 224, 226, 228, according to bench tests and platform characterizations understood by those with ordinary skill in the art. Essentially, for each operating temperature and operating state combination, performance characteristics including latencies and IDDq leakage rates may be measured for each of the processing components 222, 224, 226, 228 "at the factory" and stored in LUT 24 (or used to generate a function). From the data, the ISS module 101 may determine which of the cores 222, 224, 226, 228 may be transitioned from one operating state to another so that latency is minimized without exceeded an overall power budget of the PCD 100 or chip 102. As would be understood by one of ordinary skill in the art, the LUT 24 may exist in hardware and/or software form depending on the particular embodiment. Moreover, a LUT 24 in hardware may be fused inside silicon whereas a LUT 24 in software form may be stored in firmware, as would be understood by one of ordinary skill in the art.

Figure 3:
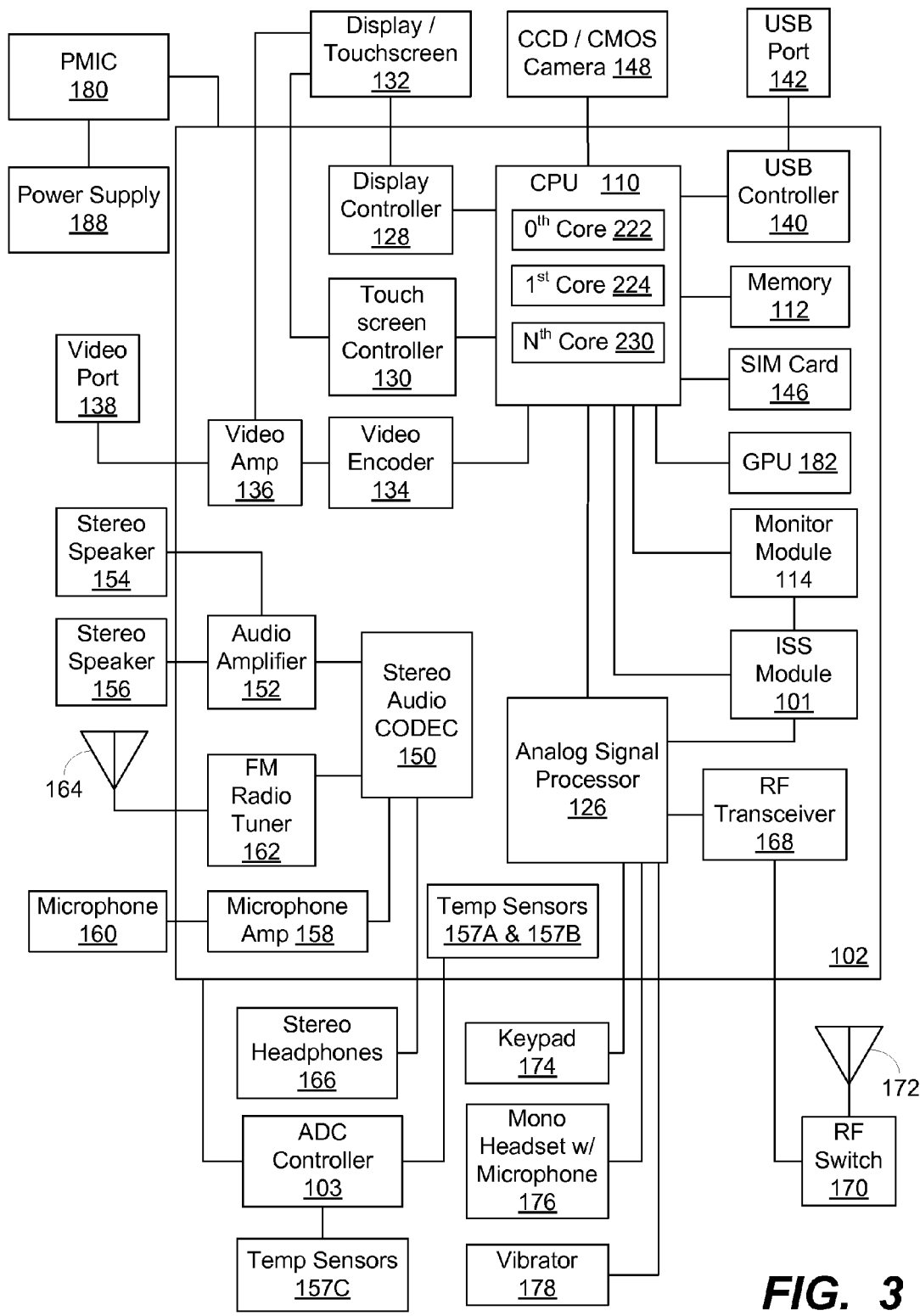
FIG. 3 is a functional block diagram of an exemplary, non-limiting aspect of a PCD in the form of a wireless telephone for implementing methods and systems for idle state optimization.

FIG. 3 is a functional block diagram of an exemplary, non-limiting aspect of a PCD 100 in the form of a wireless telephone for implementing methods and systems for idle state optimization. As shown, the PCD 100 includes an on-chip system 102 that includes a heterogeneous, multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 222, 224, 230 may process workloads at different maximum voltage frequencies, exhibit different IDDq leakage rates at given temperatures and operating states, have different latencies for transitioning from a given idle operating state to an active state, etc.

In general, the ISS module(s) 101 may be responsible for monitoring and applying idle state optimization policies that include transitioning cores between idle states such that latencies to coming back online to process workloads are minimized while respecting an overall power budget of the chip 102. Application of the idle state optimization policies may help a PCD 100 manage thermal conditions and/or thermal loads and avoid unnecessary latencies in making additional processing capacity available, such as, for example, when a burst load is scheduled for processing. The ISS module(s) 101 may receive temperature data from the monitor module(s) 114, as well as other condition indicators, and use the data to determine the impact on latencies and power consumption that may result from transitioning one or more of the cores 222, 224, 230 to a different operating state.

In this way, the ISS module(s) 101 may optimize the user experience by positioning one or more cores to quickly accommodate a burst workload without having to leave the one or more cores in a high power consumption operating state (such as an active state).

The monitor module 114 communicates with multiple operational sensors (e.g., thermal sensors 157) and components distributed throughout the on-chip system 102 and with the CPU 110 of the PCD 100 as well as with the ISS module 101. Notably, the monitor module 114 may also communicate with and/or monitor off-chip components such as, but not limited to, power supply 188, touchscreen 132, RF switch 170, etc. The ISS module 101 may work with the monitor module 114 to identify conditions within the PCD that present opportunities for optimizing the idle states of one or more processing components.

Figure 4:
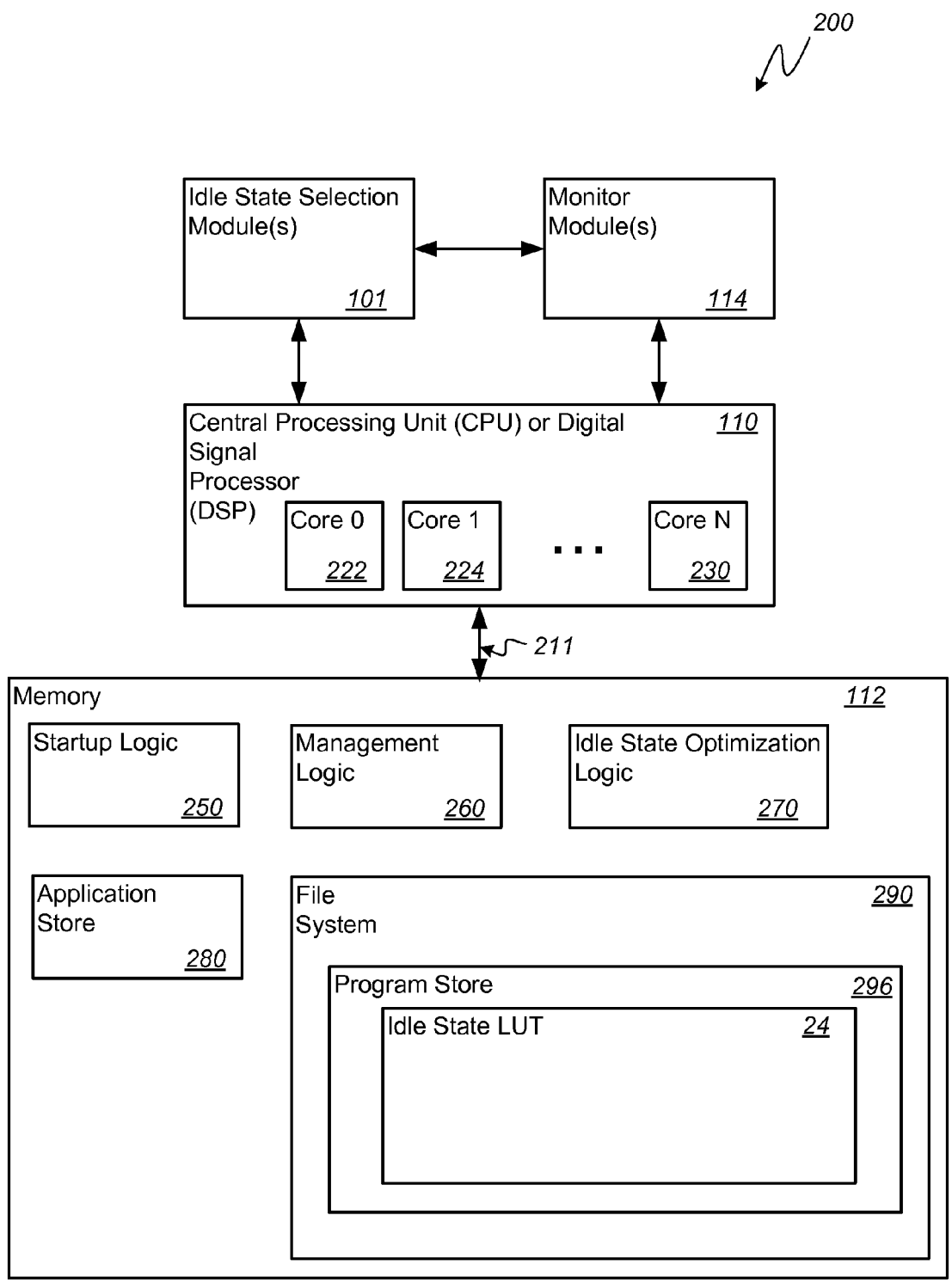
FIG. 4 is a schematic diagram illustrating an exemplary software architecture of the PCD of FIG. 3 for supporting idle state optimization.

As illustrated in FIG. 3, a display controller 128 and a touch screen controller 130 are coupled to the CPU 110. A touch screen display 132 external to the on-chip system 102 is coupled to the display controller 128 and the touch screen controller 130. PCD 100 may further include a video decoder 134, e.g., a phase-alternating line ("PAL") decoder, a sequential couleur avec memoire ("SECAM") decoder, a national television system(s) committee ("NTSC") decoder or any other type of video decoder 134. The video decoder 134 is coupled to the multi-core central processing unit ("CPU") 110. A video amplifier 136 is coupled to the video decoder 134 and the touch screen display 132. A video port 138 is coupled to the video amplifier 136. As depicted in FIG. 4, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 3, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 3, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 3 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 3 further indicates that a radio frequency ("RF") transceiver 168 may be coupled to the analog signal processor 126. An RF switch 170 may be coupled to the RF transceiver 168 and an RF antenna 172. As shown in FIG. 3, a keypad 174 may be coupled to the analog signal processor 126. Also, a mono headset with a microphone 176 may be coupled to the analog signal processor 126. Further, a vibrator device 178 may be coupled to the analog signal processor 126. FIG. 3 also shows that a power supply 188, for example a battery, is coupled to the on-chip system 102 via a power management integrated circuit ("PMIC") 180. In a particular aspect, the power supply 188 includes a rechargeable DC battery or a DC power supply that is derived from an alternating current ("AC") to DC transformer that is connected to an AC power source.

The CPU 110 may also be coupled to one or more internal, on-chip thermal sensors 157A and 157B as well as one or more external, off-chip thermal sensors 157C. The on-chip thermal sensors 157A, 157B may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157 may produce a voltage drop that is converted to digital signals with an analog-to-digital converter ("ADC") controller (not shown). However, other types of thermal sensors 157 may be employed without departing from the scope of the invention.

The thermal sensors 157, in addition to being controlled and monitored by an ADC controller, may also be controlled and monitored by one or more ISS module(s) 101 and/or monitor module(s) 114. The ISS module(s) 101 and/or monitor module(s) 114 may comprise software which is executed by the CPU 110. However, the ISS module(s) 101 and/or monitor module(s) 114 may also be formed from hardware and/or firmware without departing from the scope of the invention. The ISS module(s) 101 may be responsible for monitoring and applying idle state optimization policies that may help a PCD 100 avoid critical temperatures while maintaining a high level of functionality readiness.

Returning to FIG. 3, the touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157C, PMIC 180 and the power supply 188 are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more ISS module(s) 101. These instructions that form the ISS module(s) 101 may be executed by the CPU 110, the analog signal processor 126, the GPU 182, or another processor, in addition to the ADC controller 103 to perform the methods described herein. Further, the processors 110, 126, the memory 112, the instructions stored therein, or a combination thereof may serve as a means for performing one or more of the method steps described herein.

FIG. 4 is a schematic diagram illustrating an exemplary software architecture 200 of the PCD of FIG. 3 for supporting idle state optimization techniques. Any number of algorithms may form or be part of an idle state optimization methodology that may be applied by the ISS module 101 when temperature conditions, latency values and leakage rates of one or more cores warrant it.

As illustrated in FIG. 4, the CPU or digital signal processor 110 is coupled to the memory 112 via a bus 211. The CPU 110, as noted above, may be a multiple-core, heterogeneous processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program and, as part of a heterogeneous core, may exhibit different latency levels and different IDDq current leakage levels depending on its operating state. Alternatively, one or more applications or programs can be distributed for processing across two or more of the available heterogeneous cores.

The CPU 110 may receive commands from the ISS module(s) 101 that may comprise software and/or hardware. If embodied as software, the ISS module 101 comprises instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 4, it should be noted that one or more of startup logic 250, management logic 260, idle state optimization interface logic 270, applications in application store 280 and portions of the file system 290 may be stored on any computer-readable medium for use by or in connection with any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the idle state optimization interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for determining operational states and selecting one or more of the available cores such as the first core 222, the second core 224 through to the $N^{th}$ core 230 for transition to a different operational state. The management logic 260 includes one or more executable instructions for terminating an idle state optimization program, as well as selectively identifying, loading, and executing a more suitable replacement program(s). The management logic 260 is arranged to perform these functions at run time or while the PCD 100 is powered and in use by an operator of the device. A replacement program can be found in the program store 296 of the embedded file system 290.

The replacement program, when executed by one or more of the core processors in the digital signal processor, may operate in accordance with one or more signals provided by the ISS module 101 and/or monitor module 114. In this regard, the modules 114 may provide one or more indicators of junction temperatures in response to control signals originating from the ISS module 101.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the ISS module 101 to recognize an increased overall power budget when the skin temperature of the PCD 100 is below a certain threshold.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged idle state lookup table 24. In this regard, the file system 290 may include a reserved section of its total file system capacity for the storage of information associated with the performance characteristics of the various cores 222, 224, 226, 228 when operating at a certain operating temperature and according to a certain operating state (such as a retention idle state or WFI idle state).

Figure 5:
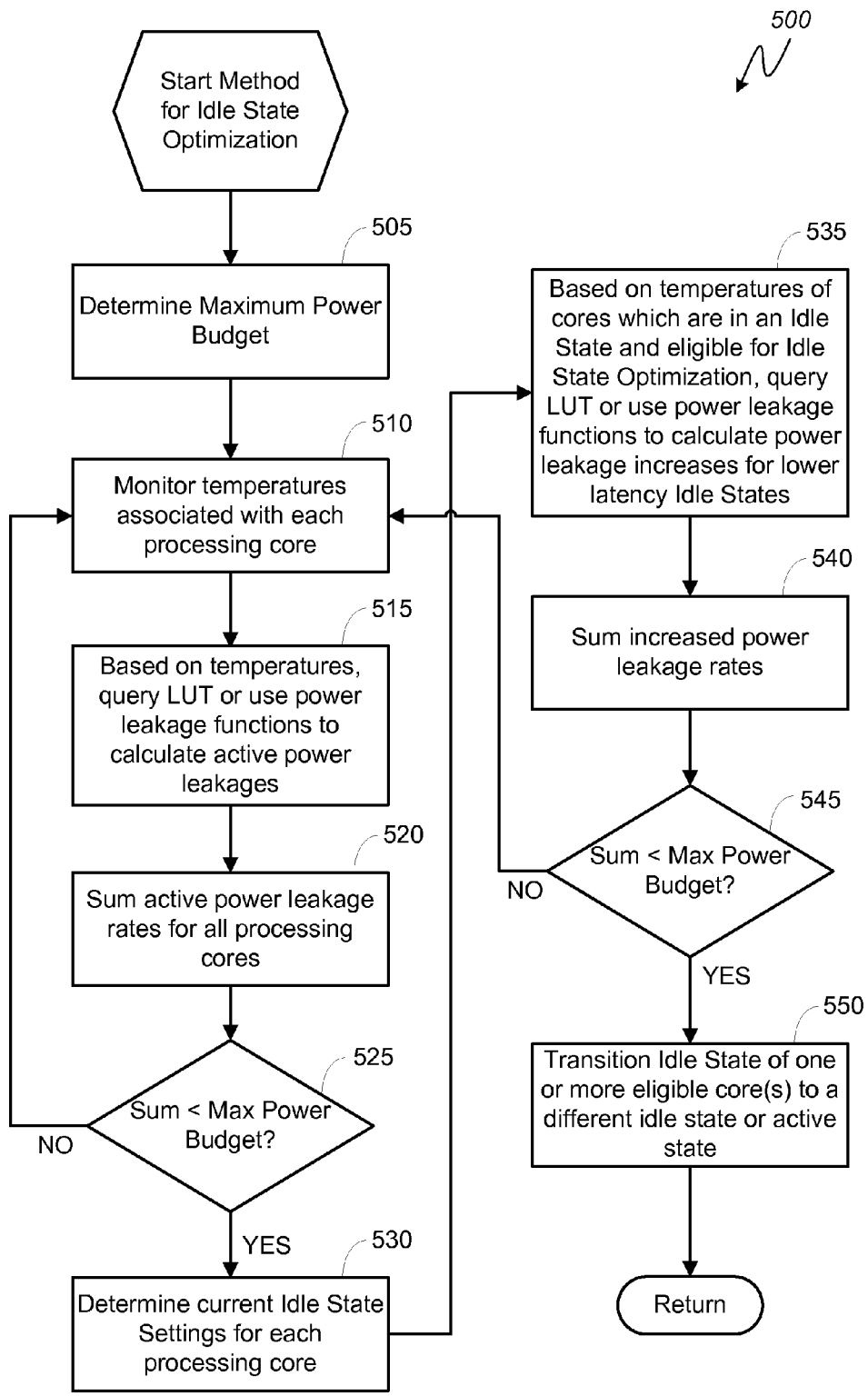
FIG. 5 is a logical flowchart illustrating an embodiment of a method for idle state optimization in the PCD of FIG. 3.

FIG. 5 is a logical flowchart illustrating an embodiment of a method 500 for idle state optimization in the PCD 100 of FIG. 3. In the FIG. 5 embodiment, the ISS module 101 is aware of an overall power budget associated with the PCD 100, the chip 102, the processor 110 or the like. As would be understood by one of ordinary skill in the art, the power budget represents a target power consumption level that, ideally, is not exceeded by the collective power consumption of the cores 222, 224, 226, 228. Notably, by selecting one or more of the cores 222, 224, 226, 228 for transitioning from one operational state to another (such as from a power collapse state to a WFI state, for example) an ISS module 101 may have a direct impact on the overall power consumption of the cores 222, 224, 226, 228 as well as the latency time that would be experienced should one or more of the cores 222, 224, 226, 228 which is in an idle state be needed to process a workload. Therefore, at block 505 of the method 500, a maximum power budget is determined.

At block 510, temperatures associated with the junction temperatures (i.e., the operating temperatures) of the cores 222, 224, 226, 228 are monitored by the monitor module 114 and provided to the ISS module 101. At block 515, the monitored temperatures are used to query a LUT 24. As described above, the LUT 24 may contain data for each core 222, 224, 226, 228 representing the functional characteristics of the core when it is operating at a certain temperature and in a certain operational mode. From the query, the power leakage levels for each core may be determined. For example, briefly referring back to FIG. 1, the leakage rate for any of cores 0, 1, 2 and 3 may be determined if the core is in the operational state and at the operating temperature represented by the table. Also, as explained above, it is envisioned that certain embodiments will use a function to simply calculate a power consumption level of a core based on its operating temperature in lieu of querying a LUT 24.

At block 520, the active leakage rates of all the cores 222, 224, 226, 228 is summed and compared against the power budget. At decision block 525, if the sum of the active leakage rates nearly meets, or exceeds, the power budget determined at block 505, the "no" branch is followed back to block 510 and the method 500 continues from there. If, however, at decision block 525 the sum of the active leakage rates is relatively less than the power budget, then the method 500 may follow the "yes" branch to block 530.

If the method 500 has proceeded to block 530, then there may be opportunity for the ISS module 101 to adjust the operational states of one or more of the cores 222, 224, 226, 228 such that latency values are reduced without the power budget being exceeded. As such, at block 530 the active settings for each of the cores 222, 224, 226, 228. The active settings may include, but are not limited to, the current operational state (i.e., whether the core is active or in an idle state) and operating temperature. From the current settings that are determined at block 530, the ISS module 101 may identify one or more cores which are eligible for transition to a different operational state. As an example, the ISS module 101 may determine that core 222 is actively processing workloads but that cores 224 and 226 are in a power collapse idle state and that core 228 is in a retention idle state. In such a scenario, the ISS module 101 may conclude that cores 224, 226 and 228 are all eligible for transitioning to a different idle state.

Returning to the method 500, at block 535 the ISS module 101 queries LUT 24 (or uses a function associated with each eligible core) for each eligible core and determines the impacts on power consumption and latency that may be realized if one or more of the eligible cores are transitioned to a different operating state. At block 540, the ISS module 101 may sum the power consumption levels for various combinations of transitions. Referring back to the example given above where the ISS module 101 determines that cores 224 and 226 are in a power collapse idle state and that core 228 is in a retention idle state, a transition combination may include the transition of core 224 to a retention state and core 228 to a WFI state, with core 226 remaining power collapsed. Notably, by making the transitions the latency required for cores 224 and 228 to transition to an active state ready to process a burst load may be improved.

For the various combinations, the likely impact on power consumption that may result from the idle state transition(s) is compared to the power budget at decision block 545. If all the sums of the identified transition combinations exceed the power budget, then there may not be enough headroom in the power budget for any core to be transitioned to an idle state associated with a reduced latency and so the "no" branch is followed back to block 510. Regarding decision block 545, it is envisioned that the method 500 may "loop" through various combinations until an optimum transition combination is identified. It is also envisioned that a combination may include the transition of operation state for only a single processing core or that it may include transitions for multiple cores.

Returning to the method 500 at decision block 545, if an expected sum of power consumption levels for a particular combination core transitions is determined to be less than the power budget, then the "yes" branch is followed to block 550 and the ISS module 101 implements the identified idle state transitions. In this way, the ISS module 101 may optimize the idle states of the one or more cores 222, 224, 226, 228 such that the latency required to bring an idle core online to process a workload is minimized without overly impacting the power consumption and thermal energy levels of the PCD 100. Advantageously, in doing so the ISS module 101 optimizes the user experience by positioning the states of various cores to quickly accommodate workload processing needs.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for idle state optimization in a portable computing device ("PCD"), wherein the PCD includes a CPU operative to execute computer readable program code stored in a non-transitory computer usable medium to control an idle state selection module operating within the PCD, the method comprising:
   the idle state selection module, under the control of the CPU, receiving a power budget, wherein the power budget represents a maximum aggregate power consumption level for a plurality of processing cores;
   the idle state selection module, under the control of the CPU, determining a current aggregate power consumption level for the plurality of processing cores;
   the idle state selection module, under the control of the CPU, comparing the current aggregate power consumption level with the power budget; and
   if the current aggregate power consumption level is less than the power budget, the idle state selection module, under the control of the CPU, causing a transition of at least one eligible processing core from a first idle state to a second idle state, wherein a latency value associated with the at least one eligible processing core is reduced by virtue of the transition from the first idle state to the second idle state.

2. The method of claim 1, wherein the current aggregate power consumption level is determined based on the operation temperatures of the plurality of processing cores.

3. The method of claim 2, wherein the current aggregate power supply is determined from a lookup table.

4. The method of claim 2, wherein the current aggregate power supply is determined from a mathematical function associated with each of the plurality of processing cores.

5. The method of claim 1, wherein the first idle state is a power collapse state and the second idle state is a "wait for interrupt" ("WFI") state.

6. The method of claim 1, wherein the first idle state is a power collapse state and the second idle state is a retention state.

7. The method of claim 1, wherein the first idle state is a retention state and the second idle state is a WFI state.

8. The method of claim 1, wherein the eligible processing core is eligible for transition because it is present in an idle operating state.

9. The method of claim 1, further comprising receiving a workload to be processed and transitioning the processing core from the second idle state to an active state.

10. The method of claim 1, wherein the PCD comprises at least one of a cellular telephone, a satellite telephone, a personal digital assistant ("PDA"), a smartphone, a navigation device, a tablet, a smartbook, a media player and a laptop computer.

11. A computer system for idle state optimization in a portable computing device ("PCD"), the system comprising:
    a CPU operative to execute computer readable program code stored in a non-transitory computer usable medium to control an idle state selection ("ISS") module and cause the ISS module to:
    receive a power budget, wherein the power budget represents a maximum aggregate power consumption level for a plurality of processing cores;
    determine a current aggregate power consumption level for the plurality of processing cores;
    compare the current aggregate power consumption level with the power budget; and
    if the current aggregate power consumption level is less than the power budget, transition at least one eligible processing core from a first idle state to a second idle state, wherein a latency value associated with the at least one eligible processing core is reduced by virtue of the transition from the first idle state to the second idle state.

12. The computer system of claim 11, wherein the current aggregate power consumption level is determined based on the operation temperatures of the plurality of processing cores.

13. The computer system of claim 12, wherein the current aggregate power supply is determined from a lookup table.

14. The computer system of claim 12, wherein the current aggregate power supply is determined from a mathematical function associated with each of the plurality of processing cores.

15. The computer system of claim 11, wherein the first idle state is a power collapse state and the second idle state is a "wait for interrupt" ("WFI") state.

16. The computer system of claim 11, wherein the first idle state is a power collapse state and the second idle state is a retention state.

17. The computer system of claim 11, wherein the first idle state is a retention state and the second idle state is a WFI state.

18. The computer system of claim 11, wherein the eligible processing core is eligible for transition because it is present in an idle operating state.

19. The computer system of claim 11, wherein the ISS module is further configured to recognize a workload to be processed and transition the processing core from the second idle state to an active state.

20. The computer system of claim 11, wherein the PCD comprises at least one of a cellular telephone, a satellite telephone, a personal digital assistant ("PDA"), a smartphone, a navigation device, a tablet, a smartbook, a media player and a laptop computer.

21. A computer system for idle state optimization in a portable computing device ("PCD"), the system comprising:
a CPU operative to execute computer readable program code stored in a non-transitory computer usable medium to control:
 a means for receiving a power budget, wherein the power budget represents a maximum aggregate power consumption level for a plurality of processing cores;
 a means for determining a current aggregate power consumption level for the plurality of processing cores;
 a means for comparing the current aggregate power consumption level with the power budget; and
 if the current aggregate power consumption level is less than the power budget, a means for transitioning at least one eligible processing core from a first idle state to a second idle state, wherein a latency value associated with the at least one eligible processing core is reduced by virtue of the transition from the first idle state to the second idle state.

22. The computer system of claim 21, wherein the current aggregate power consumption level is determined based on the operation temperatures of the plurality of processing cores.

23. The computer system of claim 22, wherein the current aggregate power supply is determined from a lookup table.

24. The computer system of claim 22, wherein the current aggregate power supply is determined from a mathematical function associated with each of the plurality of processing cores.

25. The computer system of claim 21, wherein the first idle state is a power collapse state and the second idle state is a "wait for interrupt" ("WFI") state.

26. The computer system of claim 21, wherein the first idle state is a power collapse state and the second idle state is a retention state.

27. The computer system of claim 21, wherein the first idle state is a retention state and the second idle state is a WFI state.

28. The computer system of claim 21, wherein the eligible processing core is eligible for transition because it is present in an idle operating state.

29. The computer system of claim 21, further comprising means for receiving a workload to be processed and means for transitioning the processing core from the second idle state to an active state.

30. The computer system of claim 21, wherein the PCD comprises at least one of a cellular telephone, a satellite telephone, a personal digital assistant ("PDA"), a smartphone, a navigation device, a tablet, a smartbook, a media player and a laptop computer.

31. A computer program product comprising a non-transitory computer usable medium having a computer readable program code embodied therein, said computer readable program code adapted to be executed to implement a method for idle state optimization in a portable computing device ("PCD"), said method comprising:
 receiving a power budget, wherein the power budget represents a maximum aggregate power consumption level for a plurality of processing cores;
 determining a current aggregate power consumption level for the plurality of processing cores;
 comparing the current aggregate power consumption level with the power budget; and
 if the current aggregate power consumption level is less than the power budget, transitioning at least one eligible processing core from a first idle state to a second idle state, wherein a latency value associated with the at least one eligible processing core is reduced by virtue of the transition from the first idle state to the second idle state.

32. The computer program product of claim 31, wherein the current aggregate power consumption level is determined based on the operation temperatures of the plurality of processing cores.

33. The computer program product of claim 32, wherein the current aggregate power supply is determined from a lookup table.

34. The computer program product of claim 32, wherein the current aggregate power supply is determined from a mathematical function associated with each of the plurality of processing cores.

35. The computer program product of claim 31, wherein the first idle state is a power collapse state and the second idle state is a "wait for interrupt" ("WFI") state.

36. The computer program product of claim 31, wherein the first idle state is a power collapse state and the second idle state is a retention state.

37. The computer program product of claim 31, wherein the first idle state is a retention state and the second idle state is a WFI state.

38. The computer program product of claim 31, wherein the eligible processing core is eligible for transition because it is present in an idle operating state.

39. The computer program product of claim 31, further comprising receiving a workload to be processed and transitioning the processing core from the second idle state to an active state.

40. The computer program product of claim 31, wherein the PCD comprises at least one of a cellular telephone, a satellite telephone, a personal digital assistant ("PDA"), a smartphone, a navigation device, a tablet, a smartbook, a media player and a laptop computer.

* * * * *